Dec. 16, 1952     O. W. RAHN     2,622,189
ELECTRICALLY CONDUCTIVE LUGGAGE RACK
HAVING ADJUSTABLE LIGHTING FIXTURES
Filed Jan. 13, 1951     2 SHEETS—SHEET 1
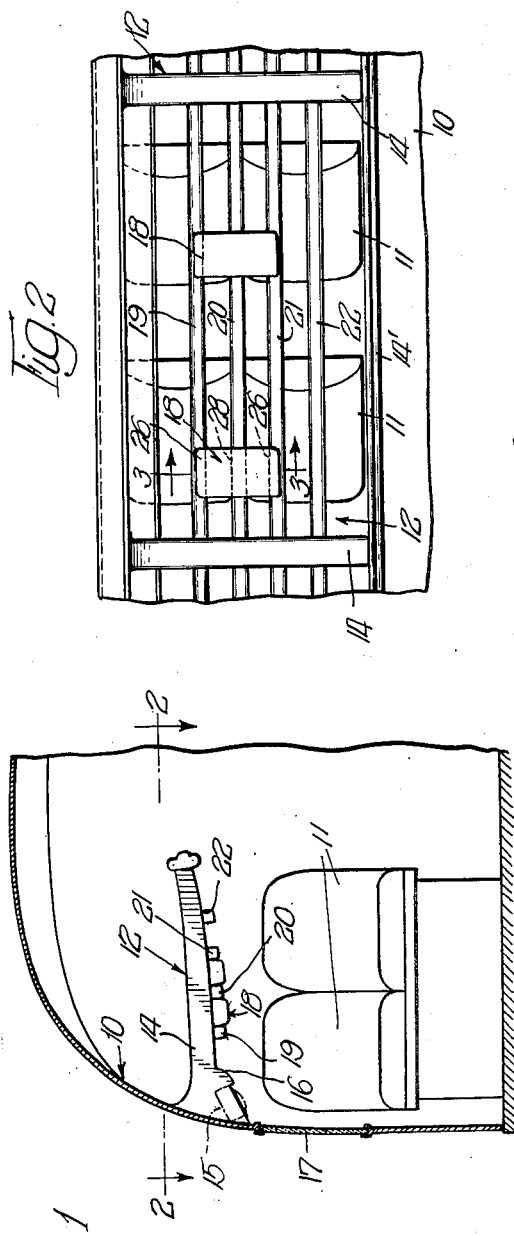
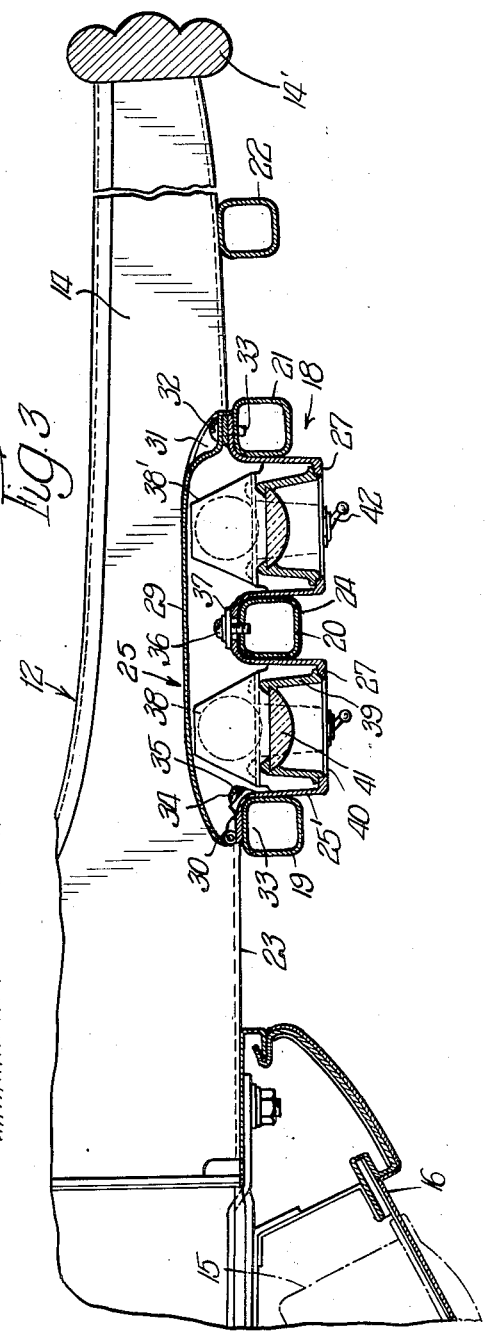
INVENTOR.
Orval W. Rahn,
BY
Cromwell, Greist & Warden
Attys Dec. 16, 1952     O. W. RAHN     2,622,189
ELECTRICALLY CONDUCTIVE LUGGAGE RACK
HAVING ADJUSTABLE LIGHTING FIXTURES
Filed Jan. 13, 1951     2 SHEETS—SHEET 2
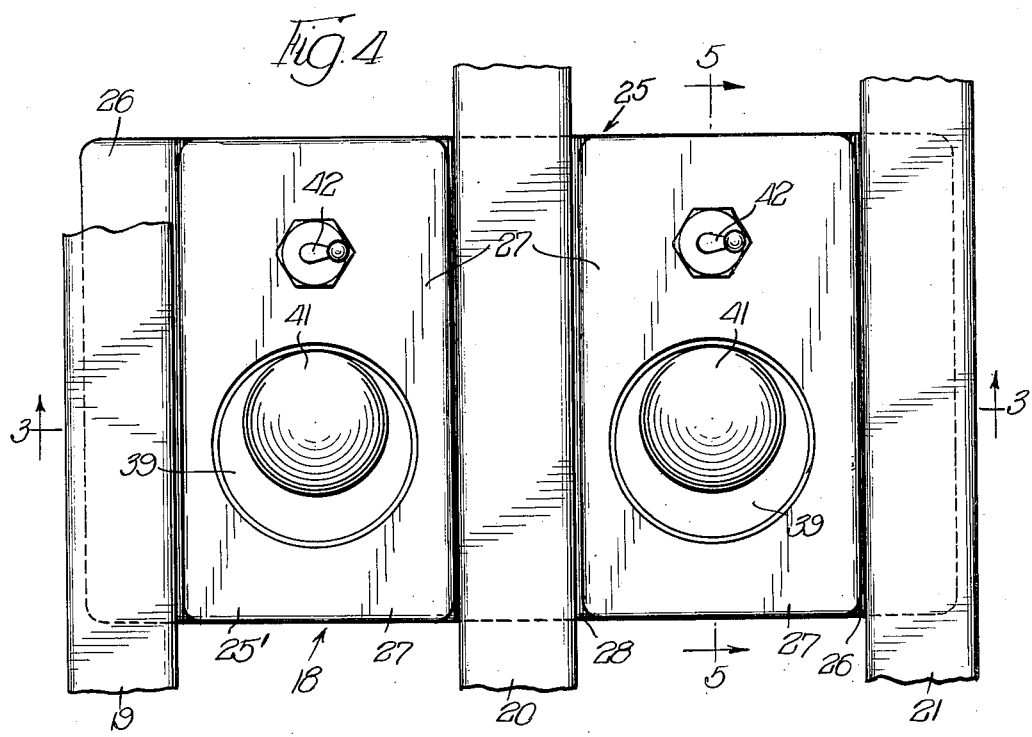
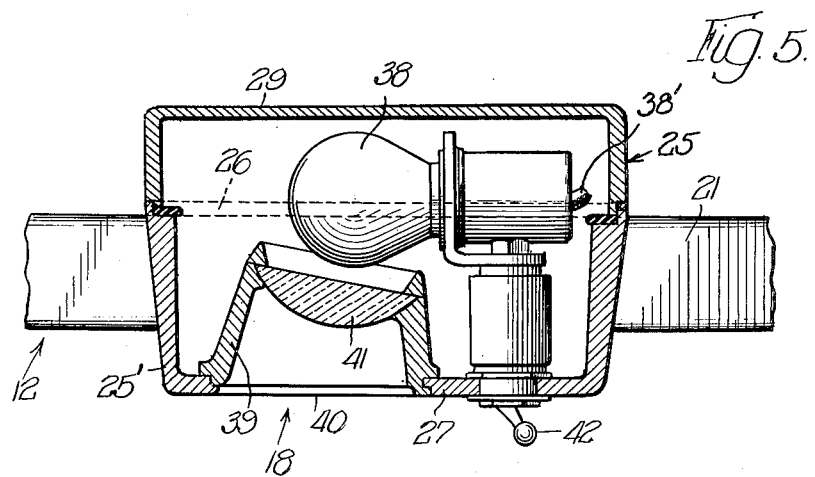
INVENTOR.
Orval W Rahn,
BY
Cromwell, Greist + Warden
Attys.

Patented Dec. 16, 1952

2,622,189

UNITED STATES PATENT OFFICE 2,622,189

ELECTRICALLY CONDUCTIVE LUGGAGE RACK HAVING ADJUSTABLE LIGHTING FIXTURES

Orval W. Rahn, Chicago, Ill., assignor to Patent License Corporation, Chicago, Ill., a corporation of Illinois Application January 13, 1951, Serial No. 205,934

14 Claims. (Cl. 240—7.35)

The present invention pertains to an improved lighting fixture, particularly devised for installation on the overhead luggage rack of a bus or related type of passenger vehicle, so as to enable the fixture to be adjusted lengthwise of the vehicle interior in accordance with the particular arrangement or spacing of the reading planes of passenger seats which it is intended to illuminate. Another feature of the invention concerns an improved means for supplying electrical current to the light source or sources of that fixture.

Considerable difficulty has heretofore been occasioned in the installation of lighting equipment in motor coaches or busses and like passenger vehicles by the fact that a bus body manufacturer usually manufactures and supplies bodies for various bus operating companies which, for one reason or another, require different arrangements or longitudinal spacings of the passenger seats along opposite sides of the central aisle. It has heretofore been the practice in most instances to install the passenger reading lights in a trim molding or light panel which extends along a side of the vehicle adjacent and over the passenger windows and on the underside of the luggage rack. The fixtures are arranged to direct reading beams downwardly and inwardly toward the aisle and onto the reading planes of the passengers. It is evident that, once the bus body manufacturer punches the trim panel to receive fixtures and otherwise prepares the same for the lighting requirements of a given bus operating company, which it will be assumed has a particular specified longitudinal spacing of seats, busses so prepared are unsuited to the requirements of another operator having another seating arrangement. This is always further assuming that the lighting fixtures are installed for most efficient lighting of the passenger reading planes. The result is that the bus body manufacturer must either delay the completion of the fixture receiving panels until a specific order for bodies is received, or must keep on hand a number of completed bodies having fixtures installed, or provisions made beforehand for the spacing thereof, to satisfy the seating arrangement of each of a number of operator customers. To the extent that a stock of bodies is frozen for one customer the ability of the manufacturer to conveniently supply other operators is decreased, to say nothing of the capital investment and cost of storage which are involved. It is highly desirable to avoid such earmarking of bodies for one only of a number of outlets.

It is therefore a general object of the invention to provide an improved and simplified lighting fixture for the interior of a bus or related commercial passenger vehicle, which fixture has novel means enabling the same to be variably positioned longitudinally of the interior of the vehicle in exact accordance with the spacing of passenger seats installed, or to be installed, along the length thereof.

Another more specific object is to provide a fixture of the above sort having provisions for mounting the same on the longitudinally extending rods or bars of an overhead luggage rack such as is commonly found in commercial passenger vehicles of the sort referred to, a number of the fixtures being adjustably sustained by said bars in proper longitudinally spaced positions determined by the longitudinal spacing of the passenger seats and at the time of installation of the fixtures thereby avoiding the aforesaid freezing of a percentage of a bus body manufacturer's production to the particular requirement of a predetermined customer operator.

Yet another object of the invention is to provide a fixture particularly devised to be adjustably mounted on and supported by one or more of the longitudinally extending bars of a standard type of passenger vehicle overhead luggage rack, in which fixture improved provision is made for supplying electrical current to the lighting element or elements thereof by using a luggage rack bar as an electrical conductor or circuit element.

The foregoing statements are indicative in a general way of the nature of the invention. Other and more specific objects will be apparent to those skilled in the art upon a full understanding of the construction and operation of the device.

A single embodiment of the invention is presented herein for purpose of illustration, and it will be appreciated that the invention may be incorporated in other modified forms coming equally within the scope of the appended claims.

In the drawings:

Fig. 1 is a fragmentary schematic view in cross section through a bus or similar passenger vehicle interior, illustrating the arrangement of the improved fixtures with reference to an existing bar-type overhead luggage rack and to a series of pairs of passenger seats on one side of a center aisle which are to be illuminated by the fixture;

Fig. 2 is a top plan view, viewed approximately from line 2—2 of Fig. 1, further illustrating the arrangement referred to above;

Fig. 3 is an enlarged fragmentary view in transverse vertical section through the fixture and associated parts, along a line corresponding generally to line 3—3 of Fig. 4, this view further illustrating the relationship of the lighting fixture and the parallel, longitudinally extending bars of the overhead rack, and also indicating in broken, dot-dash lines the trim panel lighting arrangement which the invention is intended to supplant;

Fig. 4 is an enlarged fragmentary bottom plan view of the fixture in installed relation to the longitudinal bars of the luggage rack; and Fig. 5 is a fragmentary view in longitudinal vertical section along a line corresponding to line 5—5 of Fig. 4, illustrating certain internal details of the fixture including lens mounting and light directing and focusing provisions for one or more light sources disposed internally of the housing.

Referring to Figs. 1 and 3 of the drawings, a conventional arrangement heretofore employed for the lighting of the passenger seats of a commercial bus or related passenger vehicle, generally designated 10, is indicated in broken or dot-dash lines. Pairs of passenger seats 11 are shown arranged in predetermined longitudinal spacing along either side of a central aisle and an overhead luggage rack, generally designated 12, extends above the seats, being substantially coextensive in length with the vehicle interior. This rack comprises a plurality of elongated hollow tubular bars 19–22 inclusive, longitudinally paralleling one another, which are suitably secured to the underside of each of a longitudinally spaced series of transversely inwardly extending cantilever type arms or brackets 14. Arms 14 are suitably supported on the outer wall of the vehicle, and a continuous longitudinally extending ornamental cap 14' is applied to the extremity of each, outwardly of the luggage supporting bars. The general arrangement of the arms and bars with relation to the passenger seats 11 is clearly illustrated in Figs. 1 and 2 of the drawings.

As indicated in light dot-dash lines in Figs. 1 and 3, it has been the custom to install an individual reading lighting fixture 15 for each pair of the seats 11 in a trim molding panel 16 or partial deck extending inwardly and upwardly above the window zone 17 of the vehicle body. As pointed out above, different bus operators prescribe different specifications for the longitudinal spacing of the pairs of seats 11 along the vehicle aisle, so that, if optimum lighting of the reading planes of those seats is to be had, it is necessary to select the planes at which the fixture 15 is to be installed in panel 16 with great care. This means that for a number of bus bodies which are prepared to the specification of one operator, in anticipation of an order, by installing the fixtures 15 in predetermined spacing along the sides of the vehicle body, or by providing fixture-receiving openings in a given spacing along panel 16, those bodies are immediately rendered unsuitable to the requirements of another operator having a different seat spacing plan. Accordingly, it has heretofore been necessary for the body maker to manufacture and store a quantity of bodies to the varying specifications of each and every one of a considerable number of customers or, in the alternative, to only partially complete and store bodies pending orders from different purchasers, which is impractical.

In accordance with the present invention the luggage rack 12 is employed in a novel and improved manner as a support for the adjustable mounting of the seat lighting fixtures, with which the invention also deals, per se. The fixtures are generally designated 18. I am aware that seat lighting fixtures have heretofore been built into or supported by a luggage rack, however, the disclosed arrangement makes it possible to adjust fixtures 18 longitudinally of rack 12 for selective spacing from one another in accordance with the longitudinal spacing of seats 11. This in turn enables a greater degree of standardization in the manufacture of the bus bodies, inasmuch as no particular and permanent positioning of the fixture need be attended to prior to actual installation of seats 11. The fixtures 18 are merely shifted longitudinally of bars 19–22 to desired location and then secured in place. This procedure lends itself particularly well to the improved system by which voltage is supplied to the electric light sources of the fixtures, involving the use of one or more of the longitudinal luggage rack bars as an electrical conductor.

As stated, and as illustrated in Figs. 1, 2, and 3, the luggage rack 12 includes a plurality of longitudinally extending parallel bars 19, 20, 21 and 22, equally spaced in that order from molding 16. They are appropriately supported by means not germane to the present invention from the lower surface 23 of the successive supporting arms 14. The upper surface of these bars is adapted to support luggage, garments, parcels, etc.

The rack bar 22 closest the aisle of the vehicle is not employed for the support of the fixtures 18, a function performed exclusively by the other three bars 19, 20, 21. Of these, the intermediate bar 20 also serves as an electrical conductor or bus bar, being connected in a conventional manner to the positive terminal of a source of voltage (not shown) located adjacent one end of the vehicle. The exterior of this intermediate bar 20 is therefore coated throughout its exterior surface with a thin layer 24 of electrical insulating material, preferably a tough, synthetic insulating plastic such as "Tenite," in a thickness of, say, $\frac{1}{16}''$–$\frac{1}{8}''$. Ample insurance is thereby afforded against short circuiting across bar 20 and the bars 19, 21 on either side thereof, for example through a conductor resting on the bars. The plastic coating in Fig. 3 is adequately wear and abrasion resistant to withstand damage or short circuit by impact of luggage or other objects loaded onto the same from above. The bars 19, 21 beside bar 20, or either thereof, may be employed as low potential, ground return conductors, hence need no protective coating of the sort referred to. This arrangement dispenses with costly wiring provisions.

Structural details of the fixture 18 are illustrated in Figs. 3, 4 and 5 of the drawings. It comprises a specially shaped housing 25 which comprises a lower face plate 25', preferably an aluminum die casting and, generally considered, of W-shaped cross sectional outline, as viewed in Fig. 3. Plate 25' carries a pair of integral, oppositely extending, horizontal side flanges 26 on the upper side margins thereof and is in effect subdivided into two similar hollow sections 27 by means of an intermediate connecting web 28. The web is coextensive in length with the overall longitudinal dimension of the fixture, and, as is clearly apparent in Figs. 3, 4 and 5, the flanges 26 and web 28 straddle and rest directly on the upper surface of the respective bars 19, 20 and 21, the sections 27 depending in the spaces between the bars. Maximum vertical compactness is thus achieved, together with a virtually complete hiding of the fixtures in the rack 12, due to the nested relationship shown in the drawings.

The second part of fixture 18 comprises an upper sheet metal closure or cover plate 29 which is pivoted to one side of housing 25 by means of a hinge 30. The other edge of the cover plate is externally recessed at 31 for the reception of one or more closing screws 32 by which it is held in sealed dust-tight relation to the housing interior. Other screws 33, 34 secure the housing flanges 26 to the longitudinal bars 19, 21, respectively, and may be used as return line power terminal connections to those bars by which a grounded line for the electrical circuit is established. A third screw 36 which is insulated from housing 25 by an insulating washer 37 pierces the bar insulation 24 and is tapped into center bar 20 to constitute a power supply terminal for the fixture. Light sources 38 appropriately mounted in housing 25 above the respective sections 27 of the latter are connected by leads 38' (see Fig. 5) to the respective return aand supply terminal screws 34, 36 to complete an electrical energizing circuit from a conventional source of voltage (not shown), the "hot" side of which is electrically connected to bar 20.

The housing 25 has a tubular lens mount 39 screwed into a downwardly directed opening 40 in each of the sections 27, the lens mount extending rearwardly from the lower face of the housing and supporting a plano-convex lens 41 in rearwardly retracted position. This shields direct glare from passengers in seats other than those immediately beneath and directly illuminated by the fixture. Individual light switches 42 control the respective light source 38 and it will be understood that the lens mounts 39 are positioned at a proper angle to direct beam of intensified and condensed beams downwardly onto the respective passenger seats 11.

In use, the fixture is positioned in desired location longitudinally of the bars of the luggage rack 12, in accordance with the longitudinal spacing of seats 11. For example, in an installation in which the bar supporting arms 14 are spaced on centers of, say, 36 inches, the fixture 18 is positioned from 4–6 inches rearwardly of the forward edge of a pair of seats 11, as viewed in Fig. 2. It is automatically positioned properly in the lateral sense, i. e., centered with reference to the two seats, by its straddling engagement with the bars 19, 20 and 21. Obviously, the longitudinal position of the fixture will differ in various installations, however, it is obvious that variations in spacing of seats, even in a single installation, have no effect on the ease and speed of mounting the unit which the invention makes possible. The fixture is compact and pleasing in external appearance, and its interior is readily accessible for servicing simply by backing off screws 32 and raising the cover 29.

I claim:

1. A vehicle lighting fixture adapted for installation on an electrically conductive luggage rack, comprising a hollow light housing having a supporting member adapted to engage said rack, and an electrically conductive member securing said housing supporting member to said rack and disposed in electrically conducting engagement with the latter to constitute part of an energizing circuit for a light source in said housing.

2. A vehicle lighting fixture adapted for installation on a passenger vehicle luggage rack which is characterized by spaced parallel bars, said fixture comprising a housing shaped to provide a pair of supporting portions spaced from one another in accordance with the spacing of said bars, and a light housing section between said portions, and a conducting member extending through one of said supporting portions and adapted for conducting engagement with one of said bars to secure the fixture to the latter and to constitute part of an energizing circuit for a light source in said housing.

3. A vehicle lighting fixture adapted for installation on a passenger vehicle luggage rack which is characterized by spaced parallel bars, said fixture comprising a housing shaped to provide a pair of laterally extending supporting portions spaced from one another in accordance with the spacing of said bars, and a light housing section depending between said portions and adapted to depend between said bars in the installed condition of the fixture, and a conducting member extending through one of said supporting portions and adapted for conducting engagement with one of said bars to secure the fixture to the latter and to constitute part of an energizing circuit for a light source in said housing.

4. A lighting fixture adapted for installation on a passenger vehicle luggage rack characterized by spaced parallel bars, said fixture comprising a housing shaped to provide a pair of outwardly projecting flange portions spaced from one another in accordance with the spacing of said bars, an intermediate web portion substantially coplanar with said flanges, and hollow light housing sections depending between said web and the respective flange portions and adapted to depend between said bars in the installed condition of the fixture.

5. A light fixture adapted for installation on a passenger vehicle luggage rack characterized by spaced parallel bars, said fixture comprising a housing shaped to provide a pair of outwardly projecting flange portions spaced from one another in accordance with the spacing of said bars, an intermediate web portion substantially coplanar with said flanges, and hollow light housing sections depending between said web and the respective flange portions and adapted to depend between said bars in the installed condition of the fixture, and an electrically conductive securing member disposed through one of said portions for conducting engagement with one of said bars to secure the fixture to the rack and to constitute part of an energizing circuit for a light source in said housing.

6. The combination of an electrically conductive luggage rack having a plurality of elongated, longitudinally extending luggage bars arranged in laterally spaced, parallel relation to one another, at least one of said bars being electrically conductive, and a lighting fixture mounted on said bars comprising a housing supported by said bars, said housing having a terminal member in conductive engagement with said electrically conductive bar to constitute part of an energizing circuit for a light source in said housing.

7. The combination of an electrically conductive luggage rack having longitudinally spaced transverse supports and a plurality of elongated, longitudinally extending luggage bars arranged in laterally spaced, parallel relation to one another and supported by said support, at least one of said bars being electrically conductive and provided with external insulation, and a lighting fixture mounted on said bars comprising a housing supported by said bars, said housing having a terminal member in conductive engagement with said electrically conductive bar to constitute part of an energizing circuit for a light source in said housing.

8. The combination of an electrically conductive luggage rack having longitudinally spaced transverse supports and a plurality of elongated, longitudinally extending luggage bars arranged in laterally spaced, parallel relation to one another and supported by said support, at least one of said bars being electrically conductive and provided with external insulation, and a lighting fixture mounted on said bars comprising a housing supported by said bars and depending between the same, said housing having a terminal member in conductive engagement with said electrically conductive bar to constitute part of an energizing circuit for a light source in said housing.

9. The combination of a luggage rack having an electrically conductive luggage supporting member provided with external insulation, and a lighting fixture housing adjustably mounted on said rack, said housing being provided with an electrically conductive member securing the same to the rack, said securing member being in conducting engagement with said electrically conductive luggage supporting member to constitute part of an energizing circuit for a light source in the housing.

10. The combination of an electrically conductive luggage rack having a plurality of elongated, longitudinally extending luggage bars arranged in laterally spaced, parallel relation to one another, at least one of said bars being electrically conductive and provided with external insulation, and a lighting fixture adjustably mounted on said rack comprising a housing having a pair of hollow sections connected by an intermediate web portion and provided with laterally extending flange portions, said sections depending between said bars and said web and flange portions having sustaining engagement with the same, said housing being provided with a conductive member securing the same to the rack, said securing member engaging one of said housing portions and being in conducting engagement with said electrically conductive bar to constitute part of an energizing circuit for a light source in the housing.

11. A lighting installation for vehicles comprising a housing having laterally extending portions adapted for sustaining engagement with the upper surface of a pair of laterally spaced, longitudinally extending electrically conductive supports, and adapted to depend between said supports, one or more light sources in said housing, and means for electrically energizing the same comprising a conductive terminal extending through one of said first named housing portions for electrically conducting engagement with one of said supports.

12. An installation in accordance with claim 11 in which said terminal is threaded for engagement with said support to secure the housing thereto.

13. The combination of a luggage rack having an electrically conductive luggage supporting member and a lighting fixture housing adjustably mounted on said rack, said housing being provided with an electrically conductive member in conducting engagement with said electrically conductive luggage supporting member to constitute a part of an energizing circuit for a light source in the housing, said housing having a portion in electrically insulated relation to said conductive member thereof and in conducting engagement with a further portion of said rack to constitute a further part of said circuit.

14. The combination of a luggage rack having an electrically conductive luggage supporting member provided with external insulation, and a light fixture housing adjustably mounted on said rack, said housing being provided with an electrically conductive member in conducting engagement with said electrically conductive luggage supporting member to constitute a part of an energizing circuit for a light source in the housing, said housing having a portion in electrically insulated relation to said conductive member thereof and in conducting engagement with a further portion of said rack to constitute a further part of said circuit.

ORVAL W. RAHN.

REFERENCES CITED

The following references are of record in the file of this patent:

UNITED STATES PATENTS

| Number | Name | Date |
|--------|------|------|
| 751,321 | Miller | Feb. 2, 1904 |
| 1,813,863 | Nightingale | July 7, 1931 |
| 1,923,270 | Lawrence | Aug. 22, 1933 |
| 2,091,599 | Larson et al. | Aug. 31, 1937 |
| 2,302,092 | Arenberg | Nov. 17, 1942 |
| 2,536,799 | Divizia | Jan. 2, 1950 |
| 2,552,389 | Arenberg et al. | May 8, 1951 |
| 2,562,979 | Yingling | Aug. 7, 1951 |